United States Patent [19]

Yamada et al.

[11] 4,430,656

[45] Feb. 7, 1984

[54] METHOD FOR REDUCING PRINT DISTORTION OF INK DROP WRITING APPARATUS

[75] Inventors: Takahiro Yamada, Tohkai; Tadashi Kuwabara, Hitachi, both of Japan

[73] Assignee: Hitachi, Ltd.

[21] Appl. No.: 332,248

[22] Filed: Dec. 18, 1981

[30] Foreign Application Priority Data

Dec. 19, 1980 [JP] Japan ............................... 55-178977

[51] Int. Cl.³ ............................................... G01D 9/00

[52] U.S. Cl. ........................................ 346/1.1; 346/75

[58] Field of Search ............................. 346/75, 1.1, 75

[56] References Cited

U.S. PATENT DOCUMENTS

| | | | |
|---|---|---|---|
| 3,562,757 | 2/1971 | Bischoff et al. | 346/1 |
| 3,833,910 | 9/1974 | Chen | 346/79 |
| 4,086,601 | 4/1978 | Fillmore et al. | 346/75 |
| 4,086,602 | 4/1978 | Yamada | 346/75 |

*Primary Examiner*—E. A. Goldberg
*Assistant Examiner*—Todd E. De Boer
*Attorney, Agent, or Firm*—Antonelli, Terry & Wands

[57] ABSTRACT

A method and apparatus for writing information on a writing medium with ink drops which are sequentially generated, selectively charged in accordance with the information, and directed toward the writing medium so as to impinge thereon in column form for representing the information as a continuing mark formed by a sequence of charged ink drops. A predetermined number of uncharged dummy drops is utilized for each column, and a single uncharged dummy drop is inserted only at selected locations and in a predetermined order with respect to the drop portion of the column for eliminating merging of adjacent charged ink drops when a uncharged dummy drop is inserted therebetween. An insertion location for inserting an uncharged dummy drop is initially determined between the first and last two adjacent charged ink drops, respectively, of each sequence of charged ink drops along the column and the sequentially generated ink drops are selectively charged so as to insert the uncharged dummy drops at the determined locations of the column.

13 Claims, 8 Drawing Figures

(a) (b)

| | (a) | (b) |
|---|---|---|
| MSB | 0 | 0 |
| | 0 | 0 |
| | 0 | 0 |
| | 1 | 1 |
| | 1 | 1 |
| | 1 | 0 |
| | 1 | 1 |
| | 1 | 1 |
| | 1 | 0 |
| | 0 | 0 |
| | 0 | 0 |
| | 0 | 0 |
| | 0 | 0 |
| | 1 | 1 |
| | 1 | 0 |
| | 1 | 0 |
| | 1 | 1 |
| | 1 | 0 |
| | 0 | 0 |
| | 0 | 0 |
| | 0 | 0 |
| | 0 | 0 |
| | 0 | 0 |
| | 1 | 1 |
| | 1 | 1 |
| | 1 | 0 |
| | 0 | 0 |
| | 0 | 0 |
| | 0 | 0 |
| | 0 | 0 |
| | 0 | 0 |
| LSB | 0 | 0 |

(A) 0 0 0 0 0 0 7 0 8 0 9 0 0 0 0 0 15 0 16 17 18 0 19 0 0 0 0 24 0 25 0 26 27 0 28 0 29 0 0 0

(B) 0 0 0 0 0 0 $V_7$ 0 $V_8$ 0 $V_9$ 0 0 0 0 0 $V_{15}$ 0 $V_{16}$ $V_{17}$ $V_{18}$ 0 $V_{19}$ 0 0 0 0 $V_{24}$ 0 $V_{25}$ 0 $V_{26}$ $V_{27}$ 0 $V_{28}$ 0 $V_{29}$ 0 0 0

ADDRESS 0 1 2 3 4 5 6 7 8 9 10 11 12 13 14 15 16 17 18 19 20 21 22 23 24 25 26 27 28 29 30 31 32

VOLTAGE LEVEL 0 $V_1$ $V_2$ $V_3$ $V_4$ $V_5$ $V_6$ $V_7$ $V_8$ $V_9$ $V_{10}$ $V_{11}$ $V_{12}$ $V_{13}$ $V_{14}$ $V_{15}$ $V_{16}$ $V_{17}$ $V_{18}$ $V_{19}$ $V_{20}$ $V_{21}$ $V_{22}$ $V_{23}$ $V_{24}$ $V_{25}$ $V_{26}$ $V_{27}$ $V_{28}$ $V_{29}$ $V_{30}$ $V_{31}$ $V_{32}$

METHOD FOR REDUCING PRINT DISTORTION OF INK DROP WRITING APPARATUS

BACKGROUND OF INVENTION

This invention relates to an ink drop writing apparatus and more particularly to an improved ink drop writing apparatus free from the print distortion.

Apparatus has been developed for printing on a writing medium of the information represented by video signals by generating a stream of ink drops, directing these ink drops toward the writing medium, and then, deflecting the ink drops in response to the video signal, in a manner so that when the ink drops reach the writing medium, they provide a representation of the information contained in the video signals. The general apparatus employed for producing the ink drops consists of an ink reservoir in which there is ink under pressure. The ink reservoir feeds a pipe which is connected to a nozzle.

An electromechanical transducer is employed to vibrate the pipe and the nozzle at some suitable high frequency which causes the ink to be injected from the nozzle in a stream which shortly thereafter breaks into individual drops.

In the region just before the stream breaks into drops there is placed a charging tunnel through which the stream is projected, which serves the function of applying video signals to the individual drops. Downstream of the tunnel there is provided a pair of deflection plates which have a fixed potential thereacross. The electric field which is created between the plates acts on the charged drops causing them to be deflected in an amount determined by the amplitude of the charge on the drops. Downstream of the deflection plates is usually a gutter or trough for catching any drops which do not have any charge and transferring them to a waste reservoir. There is also positioned downstream of deflection plates the writing medium which is to receive the deflected ink drops, which thereby form the images representative of the video signals. The writing medium is usually moved in synchronism with the application of video signals to the drops.

In the printing apparatus of the type briefly discribed above, when the writing ink drops are continuously used as the pattern formation ink drops, the ink drops are not able to be given a desired amount of charge and deflection and therefore form writing dots on positions deviated from the correct positions. As a result, the writing deformation occurs. The cause of the deformation is an electrostatic and aerodynamic interference between the pattern formation ink drops.

In the conventional apparatus as shown in U.S. Pat. No. 3,562,757 issued to Bischoff on Feb. 9, 1971, every Nth drops (N is a natural number) injected from the nozzle are used as the writing ink drops and the remaining drops produced between the writing ink drops are not charged. Drops without a charge are discarded as dummy or guard drops to broaden the gap between the character pattern formation ink drops so as to reduce the interference therebetween. This apparatus, however, has the drawback that the writing speed of characters is greatly reduced to $1/n+1$ of the former speed.

SUMMARY OF THE INVENTION

An object of the present invention is to provide an improved ink dop writing apparatus.

Another object of the present invention is to provide a novel ink drop writing apparatus which prevents writing distortion without reducing the writing speed.

According to the present invention, a predetermined number of uncharged dummy ink drops are produced only between the character pattern formation drops for each column.

DESCRIPTION OF THE PREFERRED EMBODIMENT

Figure 1:
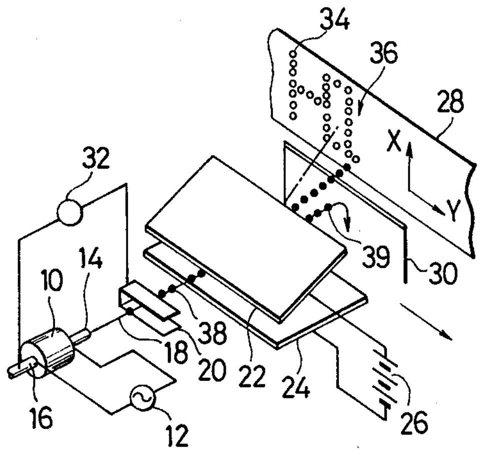
FIGS. 1 and 2 are a schematic arrangement and a block diagram showing the preferred embodiment of the present invention.
Figure 2:
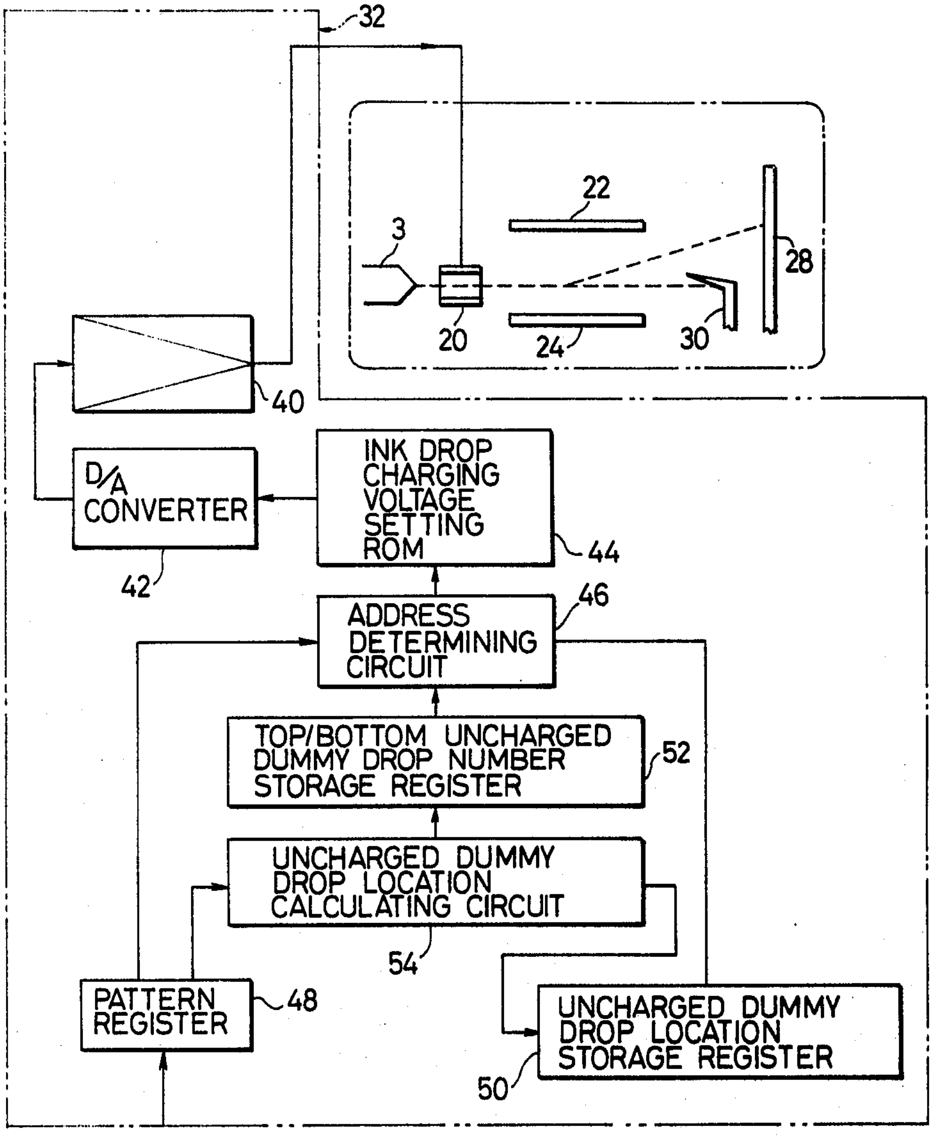

In FIGS. 1 and 2, the ink drop writing apparatus has an electromechanical transducer or a piezo-oscillator 10 connected to the high frequency electric power source 12 and a nozzle 14 attached with the piezo-oscillator 10. When the piezo-oscillator 10 is applied with a high frequency wave, pressurized ink 16 is injected as an ink column 18 to pass through a charging electrode 20 disposed in front of the nozzle 14.

Disposed in front of the charging electrode 20 are deflection plates 22, 24 which are connected with a high voltage source 26. A writing medium 28 or paper, and a gutter 30 are arranged in front of the deflection plates 22, 24. The piezo-oscillator 10 and the charging electrode 20 are connected to the character signal generator 32 and according to the character signals, writing dots 34 are formed on the paper 28. Thus the character pattern 36 is produced.

The above ink drop writing apparatus operates as follows:

(1) The voltage from the high frequency power source 12 is applied to the piezo-oscillator 10 to excite the nozzle 14, and the pressurized ink 16 is supplied to the nozzle 14 from which the ink is injected to continuously produce uniform ink drops 38 at the same frequency as the high frequency power source 12.

(2) A desired number of drops are used as writing ink drops to form the characters. When these writing ink drops 38 separate from the ink column 18, the character signal voltage from the character signal generator 32 is applied to the charging electrode 20 for charging the writing ink drops in proportion to the applied voltage.

Figure 3:
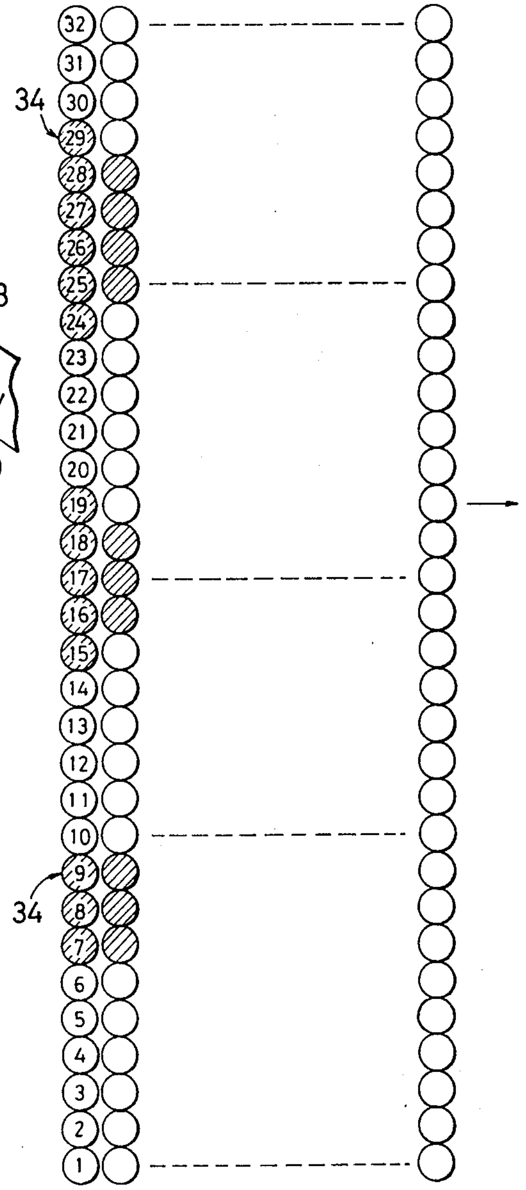
FIG. 3 is a pattern of writing character explaining the operation of the apparatus of FIGS. 1 and 2.

(3) The charged writing ink drops are passed through the electrostatic field formed by applying the voltage from the high voltage source 26 to the deflecting plates 22 and 24. The charged ink drops are deflected in the first direction X according to the amount of charge to form the writing dots 34 on the paper 28 as shown in FIG. 3.

(4) The above drop formation, charging and deflecting actions are performed while the paper 28 is moved in the second direction Y perpendicular to the first direction X. Consequently, the character pattern 36 is performed.

(5) Ink drops 39 that were not used for the formation of character pattern 36 are permitted to pass straight on to the gutter 30 where they are retrieved for reuse.

As shown in FIG. 2, connected to an amplifier 40 of the pattern signal generator 32 through a D/A converter and an ink drop charging voltage setting ROM44 is an address determining circuit 46 which is connected to a pattern register 48, an uncharged dummy drop location storage register 50, and a top/bottom uncharged dummy drop number storage register 52. Each of the registers 50 and 52 are supplied with the signals from the uncharged dummy drop location calculating circuit 54.

Figures 4, 5:
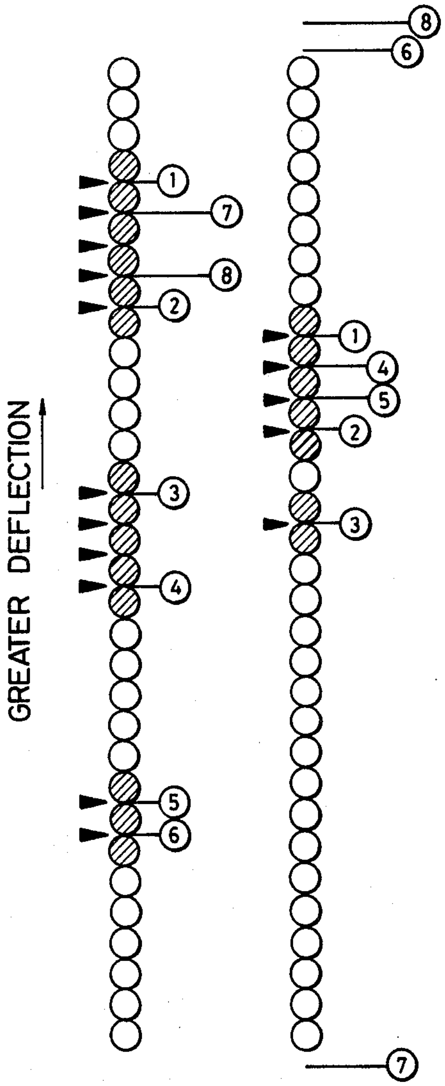
FIG. 4 is a character pattern to explain the insertion of the uncharged dummy ink drops.
FIG. 5 shows binary signals converted from the character pattern of FIG. 4.

For example, in the 32×32 dot matrix character shown in FIG. 3, eight uncharged dummy drops are allotted for each column. FIG. 4(*a*) shows the matrix elements of one column in the 32×32 dot matrix. A single writing ink drop is allotted to each element. The character pattern is formed when the writing ink drops adhere to the paper 28 to form the writing dots 34 at such locations, shown shaded, as are necessary to produce the character pattern.

In this case, eight uncharged dummy drops are allotted to this column and, are produced as follows. The marks shown at the left of the character formation ink drop column indicate the locations at which the uncharged dummy drops can be produced. These marked locations are scanned from the top where the deflection is greatest to the bottom and the uncharged dummy drops are produced at both ends of the chain of marked points. In this example, the dummy drops are generated at locations numbered 1 through 6. When the scanning reaches the bottom of the column, it returns to the top to further determine the uncharged dummy drops generating locations out of the remaining candidate locations in such a way that the dummy dot locations are always at both ends of the chain of the remaining candidate locations. This process is repeated until the number of the uncharged dummy dots reaches eight. In this example, this process ends when the locations numbered 7 and 8 in the FIG. 4(*a*) are determined. In the case of FIG. 4(*b*) where the number of uncharged dummy drop generation candidate locations is less than eight, the remaining dummy dot locations will be positioned at the top, bottom, top, bottom, . . . in that order. The drops generated at the top of the column are called top uncharged dummy drops and those generated at the bottom are called uncharged bottom dummy drops.

For the pattern shown in FIG. 4(*a*), the pattern register 48 stores the binary signals shown in FIG. 5(*a*). This pattern signal is processed in the uncharged dummy drop generation location calculating circuit 54 and the calculation result is stored in the uncharged dummy drop generating location storage register 50. The content to be stored in the register 50 is as shown in FIG. 5(*b*).

In this example, the values of the top/bottom uncharged dummy drop number storage register 52 are zero. Based on the contents of FIGS. 5(*a*) and 5(*b*) as well as the value of the top/bottom uncharged dummy dot number storage register 52, the address determining circuit 46 generates the address data shown in FIG. 6(*a*). That is, the data of address 0 is produced as many times as the number of the bottom uncharged dummy drops (in this case there is no such data generated). Then the data of the pattern register 48 (the data of FIG. 5(*a*)) is read out from LSB to MSB. When there is a 0 bit the data of address 0 is generated, and when there is a bit 1, the data of the uncharged dummy drop generation location storage register corresponding to that bit position (i.e., the data of FIG. 5(*b*)) is checked. If this data is found to be 0, the data corresponding to that bit position is outputted as the address data. When a 1 occurs, the data 0 is generated as the address data of the uncharged dummy drop, followed by the outputting of the data corresponding to that bit position. Finally, the data of address 0 is generated as many times as the number of the uncharged top dummy drops (in this case there is no such data generated), i.e., 40 address data in total.

Figures 6, 7, 8:
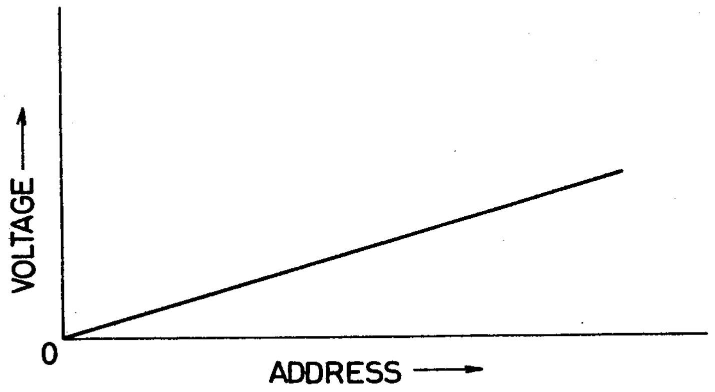
FIG. 6 is a table explaning the operation of the D/A converter.
FIG. 7 is a table showing the relation between the address and voltage level.
FIG. 8 is a graph showing the relation between the address and voltage level.

The ROM 44 stores the binary signal for each addess representing the drop charging voltage level, as shown in FIG. 7. Thus, from the address data shown in FIG. 6(*a*), the D/A converter 42 outputs the level signal of FIG. 6(*b*) as the character signal. The character signal generated by the character signal generation circuit 32 as described above is supplied to the ink jet writing unit to print characters with little distortion.

Therefore, with the above embodiment of the present invention, the uncharged dummy drops are generated where the interference between the character pattern formation drops is great and the recording distortion is most likely to occur. This widens the distance between the character formation drops at locations where the interference between the drops is great, thus reducing the interference and effectively preventing the occurrence of the recording distortion.

The method of this invention of preventing the recording distortion by producing the uncharged dummy drops may be combined with the conventional method of using as the writing drops the ink drops which are produced n drops apart. This combination makes it possible to reduce the value of n, thus preventing the reduction in the recording speed.

As can be seen from the foregoing, with this invention it is possible to prevent the occurrence of writing distortion without greatly reducing the writing speed.

We claim:

1. In a method for writing information on a writing medium with ink drops which are sequentially generated, selectively charged in accordance with the information, and directed toward the writing medium so as to impinge thereon in column form for representing the information as a continuing mark formed by a sequence of charged ink drops, the improvement comprising the steps of utilizing a predetermined number of uncharged dummy drops for each column, and inserting a single uncharged dummy drop only at selected locations and in a predetermined order with respect to the drop positions for eliminating merging of adjacent charged ink drops when an uncharged dummy drop is inserted therebetween, the step of inserting including the steps of initialing determining an insertion location for inserting an uncharged dummy drop between the first and last two adjacent charged ink drops, respectively, of each sequence of charged ink drops along the column, and controlling the selective charging of the sequentially generated ink drops so as to insert the uncharged dummy drops at the determined locations of the column.

2. A method according to claim 1, wherein the predetermined number of uncharged dummy drops is not less than the number of locations of interspace between the first and last two adjacent charged ink drops, respectively, of each sequence of charged ink drops of each column.

3. A method according to claim 1, wherein the charged ink drops are directed to the writing medium by deflecting the charged ink drops in accordance with the quantity of charge applied thereto.

4. A method according to claim 1, wherein the step of inserting further includes, after initially determining the insertion locations, subsequently determining additional insertion locations for the remaining predetermined number of uncharged dummy drops in the same predetermined order of inserting an uncharged dummy drop between the first and last two adjacent charged ink drops, respectively, of each sequence of charged ink drops along the column which have not previously been determined as insertion locations.

5. A method according to claim 4, wherein the steps of initially and subsequently determining insertion locations includes repeatedly scanning the column in the same direction until insertion locations for each of the predetermined number of uncharged dummy drops are determined.

6. A method according to claim 5, wherein the steps of determining insertion locations include determining insertion locations at the top and bottom of each column in that order during the repeated scanning of the column when insertion locations for the uncharged dummy drops have been determined for all adjacent charged ink drops of each sequence of the column until insertion locations for each of the predetermined number of uncharged dummy drops are determined.

7. In an apparatus for writing information on a writing medium with ink drops having means for sequentially generating the ink drops, means for selectively charging the ink drops in accordance with the information, and means for directing the charged ink drops toward the writing medium so as to impinge thereon in column form for representing the information as a continuing mark formed by a sequence of charged ink drops, the improvement comprising means for establishing a predetermined number of uncharged dummy drops to be utilized for each column, and means for inserting a single uncharged dummy drop only at selected locations and in a predetermined order with respect to the drop positions of the column for eliminating merging of adjacent charged ink drops when an uncharged dummy drop is inserted therebetween, the means for inserting including means for initially determining an insertion location for inserting an uncharged dummy drop between the first and last two adjacent charged ink drops, respectively, of each sequence of charged ink drops along the column, and means for controlling the selective charging means for selectively charging the sequentially generated ink drops so as to insert the uncharged dummy drops at the determined locations of the column.

8. An apparatus according to claim 7, wherein the means for establishing the predetermined number of uncharged dummy drops provides the predetermined number so as to be not less than the number of locations of interspace between the first and last two adjacent charged ink drops, respectively, of each sequence of charged ink drops of each column.

9. An apparatus according to claim 7, wherein the directing means includes means for deflecting the charged ink drops in accordance with the quantity of charge applied thereto so as to direct the charged ink drops onto the writing medium.

10. An apparatus according to claim 7, wherein the means for inserting includes means responsive to the means for initially determining the insertion locations for subsequently determining addition insertion locations for the remaining predetermined number of uncharged dummy drops in the same predetermined order of inserting an uncharged dummy drop between the first and last two adjacent charged ink drops, respectively, of each sequence of charged ink drops along the column which have not previously been determined as an insertion location.

11. An apparatus according to claim 10, wherein the means for subsequently determining additional insertion locations repeatedly scans the column in the same direction until insertion locations for each of the predetermined number of uncharged dummy drops are determined.

12. An apparatus according to claim 11, wherein the means for subsequently determining additional insertion locations determines insertion locations at the top and bottom of each column in that order during repeated scanning of the column when insertion locations for the uncharged dummy drops have been determined for all adjacent charged ink drops of each sequence of the column.

13. An apparatus according to claim 7, wherein the selective charging means includes means for generating a pattern signal indicative of the selective charging of ink drops for each column corresponding to the information, and means for storing the pattern signal, the means for inserting determining the insertion locations for the uncharged dummy drops in accordance with the stored pattern signal, the means for controlling the selective charging means including means for generating a set of signals including signals representative of the stored pattern signal indicative of charged ink drops of the column and signals of the determined locations for the uncharged dummy drops so as to control the selective charging of the sequentially generated ink drops in accordance therewith.

* * * * *